(12) United States Patent
Ilfrey

(10) Patent No.: US 9,493,669 B1
(45) Date of Patent: Nov. 15, 2016

(54) METHODS FOR POWDERED COATINGS COMPOSITIONS

(71) Applicant: CITADEL REPAIR AND RESTORATION, INC., North St. Paul, MN (US)

(72) Inventor: Patrick Ilfrey, Onalaska, WI (US)

(73) Assignee: CITADEL RESTORATION AND REPAIR, INC., St. Paul, MN (US)

( * ) Notice: Subject to any disclaimer, the term of this patent is extended or adjusted under 35 U.S.C. 154(b) by 0 days.

(21) Appl. No.: 14/544,603

(22) Filed: Jan. 26, 2015

Related U.S. Application Data

(62) Division of application No. 13/987,062, filed on Jul. 1, 2013, now Pat. No. 8,940,829.

(60) Provisional application No. 61/741,050, filed on Jul. 11, 2012.

(51) Int. Cl.

| | |
|---|---|
| *B05D 1/02* | (2006.01) |
| *B05D 1/28* | (2006.01) |
| *C08K 3/26* | (2006.01) |
| *C08K 3/22* | (2006.01) |
| *C08K 3/36* | (2006.01) |
| *C09D 125/08* | (2006.01) |
| *B05D 1/40* | (2006.01) |
| *B05D 1/42* | (2006.01) |

(52) U.S. Cl.
CPC .............. *C09D 125/08* (2013.01); *B05D 1/02* (2013.01); *B05D 1/40* (2013.01); *B05D 1/42* (2013.01); *C08K 3/22* (2013.01); *C08K 3/26* (2013.01); *C08K 3/36* (2013.01); *C08K 2003/2241* (2013.01); *C08K 2003/2248* (2013.01); *C08K 2003/2251* (2013.01); *C08K 2003/2265* (2013.01); *C08K 2003/2296* (2013.01); *C08K 2003/265* (2013.01)

(58) Field of Classification Search
None
See application file for complete search history.

(56) References Cited

U.S. PATENT DOCUMENTS 5,703,156 A * 12/1997 Sauer .................. C04B 24/2641
524/802

* cited by examiner

Primary Examiner — Vu A Nguyen
(74) Attorney, Agent, or Firm — Chris Whewell

(57) ABSTRACT

Provided are methods for using compositions of matter which exist in a powdered, free-flowing form to which water is added preferable just prior to the time of use, to yield flowable liquid compositions which are spreadable, dispersible or sprayable onto various substrates. In some embodiments the free-flowing compositions contain water-soluble styrene/acrylic acid copolymers, and can surprisingly comprise relatively large amounts of water on the order of about 20% or more, while remaining in the form of a free-flowing powder prior to their combination with additional water to yield the spreadable, dispersible or sprayable liquid compositions. By the present disclosure, shelf life concerns are eliminated, as the compositions provided have an essentially indefinite shelf life, and transportation and handling ease are greatly increased over prior art compositions due to less weight by the absence of large relative quantities of water present in prior art compositions.

5 Claims, No Drawings

METHODS FOR POWDERED COATINGS COMPOSITIONS

CROSS-REFERENCES TO RELATED APPLICATIONS

This application claims the benefit of U.S. patent application Ser. No. 13/987,062 filed Jul. 1, 2013, currently still pending, and to U.S. Provisional Application No. 61/741,050 filed Jul. 11, 2012, the entire contents of both of which are herein incorporated by reference.

TECHNICAL FIELD

This disclosure relates generally to coatings, paints, and substrate repair products. More particularly, it relates to dry compositions of matter which exist in a powder form, to which powder an end-user combines with water just prior to the material's use, to form an emulsion or mixture which is useful as a coating, paint, or substrate repair product.

BACKGROUND

Conventional water-based coatings are typically shipped from their points of origin with water already present in their formulations, thereby providing products in a ready-to-use state. Water can make up to about 95% by weight of some compositions useful as coatings, paints and repair products, and accordingly a lions share of the transportation costs associated with such products is effectively being spent on transporting water, domestically and internationally. In general, water-based products comprising multiple components in their formulations are desirably kept from freezing during their shipment, and often shipping costs are increased as the weather seasons change because some products must necessarily be maintained in heated shipping vessels.

DETAILED DESCRIPTION

The present disclosure provides coatings, paints and repair products in which the active ingredients are all dry or substantially-free from water. Compositions as provided herein are useful as wood deck and concrete restoration products, paints, coatings, and general substrate repair products, and often optionally comprise additives including but not limited to sand, $TiO_2$, waxes, and other known performance-enhancing additives.

End-users of compositions as provided herein combine them with water and optionally other water-compatible liquids (e.g. aqueous tint compositions) to activate or emulsify the active co-polymer present in a formulation according to the disclosure, and subsequently use the resulting product, within about a six-month shelf-life window.

Products provided in some embodiments of this disclosure can be shipped via normal trucking in all seasons, without concerns of the effects of freezing temperatures. Accordingly, the shelf-life of a dry composition according to this disclosure is effectively extended to several years, a major advantage over prior art products. Moreover, when combined with water at the point of use, a fresher product is provided versus the cases where users currently must obtain aqueous prior art products from store shelves. Further, aqueous prior art compositions which have substantial viscosities require extended mixing times when pigments are desired to be blended in prior to their use, whereas a composition according to this disclosure does not suffer such disadvantage. Retail or wholesale outlets that supply compositions provided herein to the public and contractors only have to add a tint composition at their place of business, which addition does not tie up time on paint shaker machines commonly present in such retail and wholesale outlets, saving valuable time and money. For cases where a customer obtains a dry composition as provided by this disclosure and chooses to combine it with water at the point of use, the customer is precluded from the necessity of having to haul around a heavy five gallon bucket of product from the store.

In some embodiments of a composition according to this disclosure, the water content can surprisingly be as high as about 25% on a weight basis, and the composition remains in a free-flowing particulate state. In other embodiments, the water content is about 20% on a weight basis, and the composition is in a free-flowing particulate state. In other embodiments, the water content is any amount between about 0.5% and 20% on a weight basis, and the composition is in a free-flowing particulate state. A free-flowing particulate composition according to this disclosure can comprise any amount of water between 0.5% and 25%, including all percentages of water and ranges of water percentages therebetween.

Coatings products including paints provided by this disclosure have increased and enhanced performance properties, as compared to prior art aqueous acrylic or latex technology products, including: increased chemical resistance, increased abrasion resistance, improved tensile strength, improved compressive strength, rapid curing times, increased hardness of cured compositions, and ease of application to a substrate.

Styrene/Acrylic Acid Co-Polymers and Water-Soluble Salts Thereof

Compositions according to some embodiments of the disclosure comprise water-soluble styrenic copolymers. Such materials are copolymers of styrene with acrylic acid, and in some embodiments the acrylic acid portion of such polymers are substituted acrylic acids. In some embodiments, compositions according to the disclosure include styrene copolymers of methacrylic acid. In other embodiments, compositions according to the disclosure include styrene copolymers of ethacrylic acid. Higher alkyl-substituted and aryl or alkyl-aryl acrylic acid species are also suitable for use in accordance with this disclosure. While an example is given below of preparation using styrene/methacrylic acid copolymers, those in the art recognize the general method is suitable for preparing other copolymers mentioned above by changing the identity of the monomer employed.

One method for preparing styrene/methacrylic acid copolymers useful in the present invention involves fitting a 3-necked 1 L round bottom flask with a mechanical stirrer, heating mantle, thermometer, reflux condenser, addition inlet, and provision for maintaining an inert atmosphere within the reaction vessel, such as a nitrogen inlet. The flask is charged with three hundred thirty six (336) grams of isopropanol and one hundred twelve (112) grams of water. Heating is commenced under stirring and slow nitrogen sweep until a gentle reflux is achieved, at about 80 deg. Centigrade. A first stream comprising eighty (80) milliliters of a 5% aqueous sodium persulfate solution is slowly added to the contents of the refluxing contents of the flask simultaneously with a second stream comprising a liquid mixture of 70.4 grams of styrene and 105.4 grams of methacrylic acid, over the course of about 2 hours. Following the addition, the temperature is maintained at reflux for an additional 2 hours to ensure complete reaction. Then, an additional ten (10) milliliters of 22% sodium persulfate is added, and the temperature maintained at reflux for one additional hour to provide a styrene/methacrylic acid copolymer.

To prepare a water-soluble salt of a copolymer produced as per the above, namely the sodium salt, a flask from the above is set up for distillation by affixing a head and condenser thereto. The flask is heated until the azeotrope of isopropanol and water begins to distill, and then two hundred thirteen (213) grams of a 23% (wt.) aqueous solution of sodium hydroxide is slowly added to the flask during the distillation at a rate which is approximately equal to the rate at which the azeotrope is being distilled. The temperature of the contents of the flask are monitored, and when the temperature reaches about 100-105 deg., the flask is allowed to cool to 50 degrees centigrade and the pH is adjusted to a level between about 8 and 10 using aqueous NaOH, and to a total solids content of between about 30 and 35% (wt.) as determined by evaporation of all of the water from a sample of known weight and dividing the weight of the solids remaining by the total initial weight and converting to a percentage by multiplication by 100. This procedure affords an aqueous solution comprising the sodium salt of styrene/methacrylic acid copolymer. Water can be driven off using conventional means such as a nitrogen sweep under reduced pressure, to leave a solid residue which can be washed with ether for example, and dried to afford a powder useful in providing a composition according to the disclosure.

Although the water-soluble salt of the copolymer whose preparation is described above as being the sodium salt as formed by the addition of aqueous sodium hydroxide in the final step in which the alcohol is removed by distillation, other basic substances which produce a water-soluble polymer are suitable as employment as neutralizing agents herein to render a material useful in a composition according to this disclosure. Such basic substances include without limitation alkaline aqueous solutions or suspensions of other soluble metal cations, metal oxides, carbonates, etc., including without limitation, basic carbonates of any of the alkali metals, alkaline earth metals, the basic oxides or hydroxides of any of the alkali metals, alkaline earth metals, transition metals, ammonia, or alkyl-substituted amines including primary, secondary, and tertiary amines provided that a solution of the copolymer results after the admixture and heating. In cases where suspensions of metal oxides are chosen to be used in neutralization, a longer heating time may be necessary to effectuate solution, depending upon the particle size of the basic substance.

In the foregoing method for preparing a styrene-methacrylic acid copolymer the styrene/methacrylic acid ratio is about 40/60. Copolymers of styrene and methacrylic acid (as well as other copolymers of styrene with other acrylates, acrylic acid, ethacrylic acid) having other ratios are also useful herein as the copolymer component from which a dry coating composition according to the present disclosure may be provided. The water-soluble forms of copolymers of styrene-methacrylic acid and other copolymers mentioned herein having any content of styrene in the range of 10.0% to 45.0%, by weight based upon the total weight of the styrene copolymer, including every hundredth percentage therebetween, are suitable for use in providing compositions according to the present disclosure. These polymers having varied amounts of styrene and methacrylic acid are made by altering the relative amounts of each of the components in the second stream referred to in the preparatory method above. For example, when a copolymer having a styrene to methacrylic acid ratio of 30:70 is desired, the second stream comprises 52.70 grams of styrene and 123.06 grams of methacrylic acid. When a copolymer having a styrene to methacrylic acid ratio of 20:80 is desired, the second stream comprises 31.15 grams of styrene and 140.61 grams of methacrylic acid, and so on, the calculation of required or desired quantities when other monomers are used instead of methacrylic acid being within the level of skill of a person of ordinary skill in the chemical arts.

The molecular weight of styrene copolymers (with ethacrylic, methacrylic or acrylic acid) useful in providing a composition according to this disclosure may be any molecular weight (weight-average molecular weight) in the range of 10,000 to about 700,000 (Daltons), including all molecular weights and all ranges of molecular weights therebetween. The molecular weight of the final copolymer is controlled by the concentration of the initiator and the chain transfer agent. In the present disclosure, one suitable chain transfer agent is isopropanol and one suitable initiator is persulfate ion. Other functionally equivalent chain transfer agents and initiators known to those skilled in the art are useful in preparing polymers described herein. Although in some embodiments a composition according to the disclosure comprises a water-soluble styrenic copolymer, other embodiments include the styrenic copolymer being in a dispersible particulate form.

Substituted styrenes are also suitable as a monomeric component of a polymer used in a composition according to this disclosure, with any acrylate derivative monomer. Such substituted styrene monomers include styrene substituted with one or more $C_1$-$C_6$ alkyl substituents, such as methyl, ethyl, propyl, butyl, pentyl, or hexyl, which alkyl group may be straight-chain or branched. These include mono-substituted $C_1$-$C_6$ alkyl styrene, including butyl styrene. A film-forming copolymer comprising a substituted styrene may be present in a composition according to the disclosure in any proportion with respect to the total amount of film-forming polymers present.

Additionally, the methacrylate, acrylate, or ethacrylate, etc. can be any $C_1$-$C_{22}$ substituted acrylate. Examples of $C_1$-$C_{22}$ alkyl groups (which may be straight-chain or branched) include methyl, ethyl, n-propyl, n-butyl, iso-butyl, tert-butyl, iso-propyl, pentyl, hexyl, cyclohexyl, 2-ethyl hexyl, heptyl, octyl, ethylhexyl, nonyl, decyl, iso-decyl, undecyl, dodecyl, tridecyl, tetradecyl, pentadecyl, hexadecyl, heptadecyl, octadecyl, nonadecyl, eicosyl, behenyl. These include methyl methacrylate, ethyl acrylate, butyl acrylate, butyl methacrylate and 2-ethylhexyl acrylate, and any isomers thereof.

After blending a composition of this disclosure with water according to a method of this disclosure, the resulting mixture typically comprises the film-forming styrene copolymer being an organic solution emulsified in water. In some embodiments of an aqueous mixture provided according to this disclosure, the water-soluble styrenic copolymer content is any amount greater than or equal to 10% and less than or equal to 35%, by weight based on the total weight of the aqueous composition provided, including any range therebetween. In other embodiments of an aqueous mixture provided according to this disclosure, the styrenic copolymer content is any amount less than or equal to 70% and greater than or equal to 35%, by weight based on the total weight of the aqueous composition provided, including any range therebetween.

Emulsifying Agents

In addition to a film-forming styrenic polymeric binder, compositions according to some embodiments of the disclosure also include at least one emulsifying agent in any amount sufficient to disperse particles of a film-forming styrenic polymer binder when the composition is blended with water. Such emulsifying agents can be present when the styrenic polymer is present in a water-soluble form or when it is present in a non-soluble but dispersible form.

Non-Film-Forming Particles

Compositions of matter provided by some embodiments of this disclosure also include at least one non-film-forming particulate substance, which can include pigments such as metal oxides, including without limitation titanium dioxide. Non-film-forming particulate substances can also include extenders, such as calcium carbonate, clays, aluminosilicates, silicas including fumed and non-fumed silicas and also any known polymeric extender(s), including extenders comprising block copolymers of polyalphaolefins.

Emulsifying Agents

Emulsifying agents suitable for various embodiments of the invention include without limitation: amphoteric/zwitterionic surfactants; anionic surfactants; nonionic surfactants; cationic surfactants.

Amphoteric surfactants suitable as an emulsifying agent in a composition according to some embodiments of the present invention can broadly be described as surface active agents containing at least one anionic and one cationic group and can act as either acids or bases depending on pH. Some of these compounds are aliphatic derivatives of heterocyclic secondary and tertiary amines in which the aliphatic radical may be straight or branched and wherein one of the aliphatic substituents contains from about 6 to about 20, preferably 8 to 18, carbon atoms and at least one contains an anionic water-solubilizing group, e. g., carboxy, phosphonate, phosphate, sulfonate, sulfate.

Zwitterionic surfactants suitable as an emulsifying agent in a composition according to some embodiments of the present invention can be described as surface active agents having a positive and negative charge in the same molecule which molecule is zwitterionic at all pH's. Zwitterionic surfactants are illustrated by the betaines and the sultaines. The zwitterionic compounds generally contain a quaternary ammonium, quaternary phosphonium or a tertiary sulfonium moiety. The cationic atom or moiety in the quaternary compound can be part of a heterocyclic ring. In all of these compounds there is at least one aliphatic group, straight chain or branched, containing from about 6 to 20, preferably 8 to 18, carbon atoms and at least one aliphatic substituent containing an anionic water-solubilizing group, e. g., carboxy, sulfonate, sulfate, phosphate or phosphonate.

Examples of amphoteric and zwitterionic surfactants as an emulsifying agent in a composition according to some embodiments of the present invention include the alkali metal, alkaline earth metal, ammonium or substituted ammonium salts of alkyl amphocarboxyglycinates and alkylamphocarboxypropionates, alkyl amphodipropionates, alkyl monoacetate, alkyl diacetates, alkylamphoglycinates, and alkyl amphopropionates wherein alkyl represents an alkyl group having from 6 to about 20 carbon atoms. Other suitable emulsifying agents include alkyliminomonoacetates, alkyliminidiacetates, alkyliminopropionates, alkyliminidipropionates, and alkylamphopropylsulfonates having between 12 and 18 carbon atoms, alkyl betaines and alkylamidoalkylene betaines and alkyl sultaines and alkylamidoalkylenehydroxy sulfonates.

Anionic surfactants useful as an emulsifying agent in a composition according to some embodiments of the present invention are those surfactant compounds which contain a long chain hydrocarbon hydrophobic group and a hydrophilic group in their molecular structure, including salts such as carboxylate, sulfonate, sulfate or phosphate groups. The salts may be sodium, potassium, calcium, magnesium, barium, iron, ammonium and amine salts of such surfactants. Anionic surfactants include the alkali metal, ammonium and alkanol ammonium salts of organic sulfuric acid or acidic organic sulfonate reaction products having in their molecular structure an alkyl, or alkaryl group containing from 8 to 22 carbon atoms and a sulfonic or sulfuric acid ester group. Examples of such anionic surfactants include water soluble salts of alkyl benzene sulfonates having between 8 and 22 carbon atoms in the alkyl group, alkyl ether sulfates having between 8 and 22 carbon atoms in the alkyl group and 2 to 9 moles ethylene oxide in the ether group. Other suitable anionic surfactants include alkylsulfosuccinates, alkyl ethersulfosuccinates, olefin sulfonates, alkyl sarcosinates, alkyl monoglyceride sulfates and ether sulfates, alkyl ether carboxylates, paraffinic sulfonates, mono and di-alkyl phosphate esters and ethoxylated derivatives, acyl methyl taurates, fatty acid soaps, collagen hydrosylate derivatives, sulfoacetates, acyl lactates, aryloxide disulfonates, sulfosucinamides, naphthalene-formaldehyde condensates and the like. Aryl groups generally include one and two rings, alkyl generally includes from 8 to 22 carbon atoms and the ether groups generally range from 1 to 9 moles of ethylene oxide (EO) and/or propylene oxide (PO), preferably EO. Specific anionic surfactants which may be selected include linear alkyl benzene sulfonates such as decylbenzene sulfonate, undecylbenzene sulfonate, dodecylbenzene sulfonate, tridecylbenzene sulfonate, nonylbenzene sulfate and the sodium, potassium, ammonium, triethanol ammonium and isopropyl ammonium salts thereof.

Nonionic surfactants are also suitable as an emulsifying agent in a composition according to some embodiments of the present invention. The particular nonionic surfactant (s) selected is not generally critical and may be any of the known nonionic surfactants which are generally selected on the basis of compatibility, effectiveness and economy. Examples of useful nonionic surfactants include condensates of ethylene oxide with a hydrophobic moiety which has an average hydrophilic lipolytic balance (HLB) between about 8 to about 16, and preferably between about 10 and about 12.5. These surfactants include the ethoxylated primary or secondary aliphatic alcohols having from about 8 to about 24 carbon atoms, in either straight or branch chain configuration, with from about 2 to about 40, and preferably between about 2 and about 9 moles of ethylene oxide per mole of alcohol. Other suitable nonionic surfactants include the condensation products of from about 6 to about 12 carbon atoms alkyl phenols with about 3 to about 30, and preferably between about 5 to about 14 moles of ethylene oxide.

Many cationic surfactants are known in the art and almost any cationic surfactant having at least one long chain alkyl group of about 10 to 24 carbon atoms is suitable for use as an emulsifying agent in a composition according to some embodiments of the present invention. Mixtures of two or more than two of any of the aforementioned surfactants are also useful in accordance with some embodiments of the invention.

Colorants

Various colorants or tints or the like and mixtures thereof are useful as additives to impart color to a composition provided by various embodiments of this invention, such as those marketed by Citadel Floor Finishing Systems ("CFFS") of Blaine, Minn. including without limitation: Limestone Universal Industrial Tint™ product (CFFS); Earth Brown Universal Industrial Tint™ (CFFS); Pewter Universal Industrial Tint™ product (CFFS); Nickel Universal Industrial Tint™ (CFFS); Brick Red Universal Industrial Tint™ (CFFS); and Patina Universal Industrial Tint™ (CFFS). In some embodiments such tint(s) are employed are about 8% to about 15% by volume. Dry pigments and glycol-based tints are also suitable.

Free-flowing powdered compositions according to some embodiments of this disclosure feature a water-soluble styrenic copolymer (with an acrylic acid species) content of between 30% and 80% by weight based on the total weight of the composition, including all percentages and ranges of percentages therebetween.

The average particle size of the particles present in a free-flowing powdered composition according to some embodiments is any average particle size in the range of between 0.1 micron and about 3 millimeters diameter including all average particle sizes and ranges of average particle sizes therebetween, regardless of the method used to measure average particle size. As used herein "free-flowing" has its usual meaning in the art, meaning that if a cup of the material is tilted sideways, the powdered material flows substantially the same as would table salt or refined sugar granules.

Other optional ingredients or additives which may be present in a composition according to some embodiments of the present invention include pH adjusting chemicals, for example, lower alkanolamines such as monoethanolamine (MEA) and triethanolamine (TEA). Sodium hydroxide may also be utilized as an alkaline pH adjusting agent. The pH adjusting chemicals function to neutralize acidic materials that may be present, to any desired degree. Mixtures of more than one pH adjusting chemical can also be utilized.

Phase regulants (well known liquid detergent technology) may also be optionally present in some embodiments of the present invention. These can be represented by lower aliphatic alcohols having from 2 to 6 carbon atoms and from 1 to 3 hydroxyl groups, ethers of diethylene glycol and lower aliphatic monoalcohols having from 1 to 4 carbon atoms and the like.

Detergent hydrotropes may also be included in some embodiments. Examples of detergent hydrotropes include salts of alkylarylsulfonates having up to 3 carbon atoms in the alkyl group e. g., sodium, potassium, ammonium, and ethanolamine salts of xylene, toluene, ethylbenzene, cumene, and isopropylbenzenesulfonic acids.

Other optional supplemental additives include de-foamers such as high molecular weight aliphatic acids, especially saturated fatty acids and soaps derived from them, dyes and perfumes; fluorescent agents or optical brighteners; suspension stabilizing agents and soil release promoters such as copolymers of polyethylene terephthalate and polyoxyethylene terephthalate; antioxidants; softening agents and antistatic agents; photo activators and preservatives; polyacids, suds regulators, opacifiers, bacteriacide, and the like. Suds regulants can illustrated by alkylated polysiloxanes and opacifiers can be illustrated by polystyrene; bactericide can be illustrated by butylated hydroxytoluene.

Although not required, an inorganic or organic builder may optionally be added in small amounts to a final composition according to some embodiments of the invention. Examples of inorganic builders include water-soluble alkali metal carbonates, bicarbonates, silicates and crystalline and amorphous alumino-silicates. Examples of organic builders include the alkali metal, alkaline metal, ammonium and substituted ammonium polyacetates, carboxylates, polycarboxylates, polyacetyl carboxylates and polyhydroxy sulfonates. One example of a commonly used builder is sodium citrate.

In some embodiments the present disclosure provides a kit, containing:
- a bag containing about 8.9 pounds of powdered composition comprising a water-soluble styrenic copolymer;
- a jar or other suitable liquid measuring vessel of about 16 fluid ounces liquid capacity; and
- any pre-selected or desired quantity of a colorant or tint.

In some embodiments, the examples provided below were produced using such a kit. In some embodiments, the powdered composition comprises a water-soluble, film-forming polymer as described above, an emulsifying agent, and optionally a non-film-forming polymer.

EXAMPLES

The examples which follow now shall be considered only as exemplary of the scope of present invention to a person of ordinary skill in the art, and not delimitive thereof.

Example 1

This example illustrates the reconditioning/re-coating of a cedar wood deck using a water/polymer-based cementitious solid color coating system in a red color hue. A cedar wood deck, approximately 200 square feet ("SF") of horizontal surface and 200 SF of vertical surface was swept clean of debris and stripped of its existing stain using a standard liquid "Deck Stripper" by following the manufacturer's guidelines. The next step was to use a "Deck Brightener" to clean the existing boards removing any mold, mildew or bacteria and to effectively brighten the wood to make look new per the manufacturer's guidelines. Next, a belt sander with 80 grit pads was employed to sand the deck to remove any of the dead wood and to effectively open up the wood to allow a coating system to bond to it.

The next step was to apply the coating system. We first opened the bag of dry polymer mix and then into a empty bucket, poured in 48 oz. of water along with 12 oz. of red of tint. Next, the dry polymer mix was slowly poured into the bucket while a cordless drill with a wooden mixer agitated the water and dry polymer. Once the full bag of polymer mixture was poured in, the cordless drill and wooden mixer blended the dry polymer mix, water and tint to a uniform color/milkshake consistency which took approximately 2 minutes. The mixed material was then poured into a paint tray. A 4" (looped roller) was employed to apply the product to the vertical surfaces, cutting in hard to reach areas with a 3" cut brush. A 9" (looped roller) was then saturated with the coating composition and the material applied to the horizontal boards of the deck by covering two boards at a time with the dry polymer coating system. This process was repeated until the entire deck was coated. Once the first coat was cured, approximately four hours later, a second coat was applied only to the horizontal surface area by mixing the material, pouring the mixed material into a paint tray and applying it two boards at a time with a 9" (looped roller). The first coat achieved a spread rate of 50 SF per gallon and second coat achieved a spread rate of 75 SF per gallon. The coating system was then complete and allowed to dry for 24 hrs.

Example 2

This example illustrates the reconditioning/re-coating of Green-treated lumber Deck using a water-based latex powder mix in a Dark Chocolate color hue. Treated Lumber deck, approximately 150 SF of horizontal surface and 175 SF of vertical surface was swept clean of debris. The next step was to use a "Deck Brightener" to clean the existing boards removing any mold, mildew or bacteria and to effectively brighten the wood to make look new per the manufacturer's guidelines. Next, a hand-grinder with 60 grit pads was employed to sand the deck to remove any of the dead wood and to effectively open up the wood to allow a coating system to bond to it.

The next step was to apply the coating system. The dry latex powder bag was opened and the contents were poured into a bucket. Next, 32 oz of water and 8 oz. of Dark Chocolate tint were added to the dry latex powder mix and mixed with a drill and turbo "jiffy" mixer blade until uniform color was achieved. The vertical spindles (balusters) were coated first out of a cup using a 3" paint brush. After the verticals were coated, the latex dry powder mix was put into a hopper gun and spray applied to the horizontal deck boards to a textured, solid color appearance. This process was repeated until the entire deck was coated. The first coat applied at a rate of 100 SF per gallon. 6 hrs after the first coat was applied; the latex powder mix was applied to the vertical spindles with a 3" paint brush. The horizontal boards were then coated by pouring the latex dry powder mix into a hopper gun and spray applied to the horizontal deck boards to a textured, solid color appearance. This process was repeated until the entire horizontal surface was uniformly coated. Immediately after finishing the entire deck, a smooth trowel was used to "knock" down the texture. The coating system installation was now complete and left to dry for 24 hrs. before use.

Example 3

This example illustrates the reconditioning/re-coating of a Green-treated Lumber Pier/Patio combo at a public boat landing with a Solid Color, Dry Polymer mix kit that is water-based in a Cedar Tone. The product is engineered to eliminate the need to replace old, worn out boards that would normally need to be replaced. Treated Lumber Pier/Patio combo, approximately 720 SF of horizontal surface was swept clean of debris and stripped of its existing stain using a standard liquid "Deck Stripper" by following the manufacturer's guidelines. Next, a "Deck Brightener" was employed to clean the existing boards removing any mold, mildew or bacteria and to effectively brighten the wood to make look new per the manufacturer's guidelines. Next, a vibrating deck sander with 60 grit pads was used to sand the deck to remove any of the dead wood and to effectively open up the wood to allow a coating system to bond to it.

The next step was to apply the coating system. The contents of the bucket (dry powder bag, wooden mixing wand, tint shot jar filled with cedar tone tint and instructions) were removed. The bag of dry powder was opened and poured back into the bucket. The tint shot jar filled with Cedar tone tint was opened and added to the bucket on top of the dry mixture. Then the tint shot jar was filled up to the brim with cool, clean water and dumped into the bucket containing the dry polymer mixture and tint. The tint shot jar was refilled with water and dumped into the bucket two additional times. Next, we used the supplied wooden mixing wand attached to a cordless drill and spun up the dry polymer mixture, tint and three tint shot jars worth of water until a uniform color was achieved. A garden hose with a spray nozzle set to the "mist" setting was used to mist the deck to basically "wet-out" the deck. Next, the "mixed" material was poured into a paint tray and a "looped" 9" roller attached to a 6' threaded roller pole was used to apply the product two boards at a time. This process of dipping the looped roller into the pan and applying the product two boards at a time was employed until the quantity of initial product was consumed. An additional kit was then opened and mixed following the same mixing procedure described above. The mixed product was then applied to two boards at a time with the looped roller out of a 9" roller pan. This entire process was repeated until the 720 SF of Pier/Patio was covered. This product was allowed to dry 6 hrs. After 6 hrs, a second coat was applied following the same mixing and application procedures described above for the 120 SF of Pier. The spread rate of 75 SF per kit was achieved with this product. The 600 SF Patio required a smoother finish so the "mixed" product was thinned with an additional 6 oz's of water to eliminate the "roughness" of the finish. The product was applied with a 9" looped roller out of a pan, two board widths at a time. The second coat spread at a rate of 100 SF per kit. The coating system was left to cure for 48 hrs.

Example 4

This example illustrates the reconditioning/re-coating of a plywood front porch floor (including a 6' long, red-wood sitting bench) using a Solid Color (white), dry polymer mix kit that is designed to maintain the wood grain while giving the plywood substrate some anti-slip properties. A brand new plywood porch, approximately 200 SF of horizontal surface (including a 6' long, redwood sitting bench) was swept clean of debris. Next, a swing machine with an 80 grit sanding pad was used to sand the plywood porch floor to remove any of the splinters, dead wood, "mill glaze" and to effectively open up the wood to allow a coating system to bond to it. The redwood sitting bench was sanded using a hand grinder with a 5" (60 grit) sanding pad. The next step was to apply the coating system. The contents of the bucket (dry powder bag, wooden mixing wand, tint shot jar filled with white tint and instructions) were removed. The bag of dry powder was opened and poured back into the bucket. The tint shot jar filled with White tint was opened and dumped into the bucket on top of the dry mixture. Then the tint shot jar was filled up to the brim with cool, clean water and dumped into the bucket containing the dry polymer mixture and tint. The tint shot jar was refilled with water and dumped into the bucket one additional time. Next, we used the supplied wooden mixing wand attached to a cordless drill and spun up the dry polymer mixture, tint and two tint shot jars worth of water until a uniform color was achieved. The plywood floor and bench was misted with water out of a pump up sprayer. Next, the remaining "mixed" material was poured into a paint tray and a 9" (⅜" Nap roller) attached to a 6' threaded roller pole was employed to apply the product in an "m" and "w" pattern until a uniform white finish was achieved. The same process was used to coat the remainder of the porch. The same 9" roller was used to coat the redwood sitting bench by applying the product in a linear motion coating two boards at a time. A 3" paint brush was used for the hard to reach places. This product was allowed to dry 6 hrs. Before the second coat, the "mixed" material was used to fill in screw holes in the plywood to smoothen out the finish of the floor. This was done by taking a putty knife and scooping up some of the "mixed" material out of the bucket and applying it into the screw holes and scraping it smooth to level off the repair area. The same "mixed" material was used on the sitting bench to fill in some cracks and knot holes by scooping the "mixed" material out of the bucket with the putty knife and applying it into the necessary repair areas and scraping the excess off to smoothen out the finish and to hide the cracks and knot holes. The repair areas were left to cure for 1 hr. The second coat was applied following the same mixing and application procedures described above. The product was successfully applied over entire area and left cure for 24 hrs. The spread rate achieved was 100 SF per kit for the two coats.

Example 5

This example illustrates the reconditioning/re-coating of an interior/exterior concrete slab using a solid color (Grey), dry polymer mix kit that is designed to achieve a matte finish with anti-slip properties. The interior/exterior concrete slab, approximately 500 SF of horizontal surface was swept clean of debris. The floor was then etched with a muriatic acid replacement following the manufacturer's instructions. The slab was then rinsed with water three times with a pressure washer to eliminate the etch and neutralize the slab, which was then left to air-dry.

The next step was to apply the coating system. The contents of the bucket (dry powder bag, wooden mixing wand, tint shot jar filled with grey tint and instructions) were removed. The bag of dry powder was opened and poured back into the bucket. The tint shot jar filled with grey tint was opened and dumped into the bucket on top of the dry mixture. Then the tint shot jar was filled up to the brim with cool, clean water and dumped into the bucket containing the dry polymer mixture and tint. The tint shot jar was refilled with water and dumped into the bucket one additional time. Next, a wooden mixing wand attached to a cordless drill was used to mix up the dry polymer mixture, tint and two tint shot jars worth of water until a uniform color was achieved. The concrete slab was then misted with water out of a pump up sprayer. Then, the "mixed" material was poured into a paint tray and a 18" (⅜" Nap roller) attached to a 6' threaded roller pole was used to apply the product in an "m" and "w" pattern until a uniform grey finish was achieved. The same process was used to coat the remainder of the concrete slab. A 3" paint brush was used for the hard to reach places. This product was allowed to dry 4 hrs. Before the second coat, the "mixed" material was used to fill in spalled areas in the concrete slab to smoothen out the finish of the floor. This was done by taking a putty knife and scooping up some of the "mixed" material out of the bucket and applying it into the spalled areas and scraping it smooth to level off the repair area. The same "mixed" material was used to fill in cracks and by scooping the "mixed" material out of the bucket with the putty knife and applying it into the necessary repair areas and scraping the excess off to smoothen out the finish and to hide the cracks. The repair areas were left to cure for 1 hr. The second coat was applied following the same mixing and application procedures described above. The product was successfully applied over entire area and left to cure for 24 hrs. The spread rate achieved was 100 SF per kit for the two coats.

Example 6

This example illustrates painting of an interior sheetrock ("drywall") wall using a solid color (blue) dry polymer mix. An interior sheetrock wall, approximately 120 SF of vertical sheetrock was sanded with 200 grit sandpaper using a pole sander. The next step was to apply the coating system. The contents of the bucket (dry powder bag, wooden mixing wand, tint shot jar filled with blue tint and instructions) were removed. The bag of dry powder was opened and poured back into the bucket. The tint shot jar filled with blue tint was opened and dumped into the bucket on top of the dry mixture. Then the tint shot jar was filled up to the brim with cool, clean water and dumped into the bucket containing the dry polymer mixture and tint. The tint shot jar was refilled with water and dumped into the bucket one additional time. Next, a wooden mixing wand attached to a cordless drill was used to mix up the dry polymer mixture, tint and two tint shot jars worth of water until a uniform color was achieved. Next, the "mixed" material was poured into a paint tray and a 18" (⅜" Nap roller) attached to a 6' threaded roller pole was used to apply the product in an "m" and "w" pattern until a uniform blue finish was achieved. The same process was used to coat the remainder of the sheetrock wall. A 3" paint brush was used to cut in around the baseboard and ceiling. This product was allowed to dry 4 hrs. The second coat was applied following the same mixing and application procedures described above. The product was successfully applied over entire area and left to cure for 24 hrs. The spread rate achieved was 120 SF per kit for the two coats.

Example 7

This example illustrates the coating of a concrete patio using water-based latex powder mix in a Tan color. The concrete patio, approximately 200 SF of horizontal surface was swept clean of debris, and the patio was etched with a muriatic acid following the manufacturer's instructions. The slab was then rinsed with water three times with a pressure washer to eliminate the etch and neutralize the slab. The concrete slab was then left to dry.

The next step was to apply the coating system. The dry latex powder bag was opened and the contents were poured into a bucket. Next, 32 oz. of water and 8 oz. of tan tint were added to the dry latex powder mix and mixed with a drill and turbo "jiffy" mixer blade until uniform color was achieved. The latex powder mix was put into a hopper gun and spray applied to the concrete patio to a textured, solid color appearance. This process was repeated until the entire patio was coated. 3 hrs after the first coat was applied, the concrete patio was then coated by pouring the latex powder mix into a hopper gun and spray applied to the previous coating to a textured (bubbled), solid color appearance. This process was repeated until the entire surface was uniformly coated. The coating system installation was now complete and left to dry for 24 hrs.

Consideration must be given to the fact that although this invention has been described and disclosed in relation to certain embodiments, equivalent modifications and alterations thereof may become apparent to persons of ordinary skill in this art after reading and understanding the teachings of this specification, drawings, and the claims appended hereto. The present disclosure includes subject matter defined by any combinations of any one or more of the features provided in this disclosure with any one or more of any other features provided in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified. A kit as described herein in some embodiments includes a free-flowing powdered composition having features described herein, and the claims, in any combination. The present invention has been disclosed and claimed with the intent to cover modifications and alterations that achieve substantially the same result as herein taught using substantially the same or similar structures, being limited only by the scope of the claims which follow.

I claim:

1. A method of forming a coating on a substrate, comprising:
    a) providing a composition of matter which comprises:
        i) at least one water-soluble styrenic copolymer of an acrylic acid species, said styrenic copolymer being present in any amount between 30% and 80% by weight based on the total weight of said composition;
        ii) at least one emulsifying agent; and
        iii) at least one non-film-forming particulate substance, said composition existing in the form of a free-flowing powder, wherein the water content of said composition is between 0.5% and 25% by weight based on the total weight of the composition and wherein said non-film-forming particulate substance comprises a compound selected from the group consisting of calcium carbonate, zinc oxide, titanium dioxide, copper oxide, silicon dioxide, chromium (III) oxide, and zirconium dioxide,
    b) combining said composition with a sufficient quantity of water to yield a substantially-uniform mixture that can be spread or dispersed about said substrate;
    c) applying said mixture substantially uniformly to said substrate; and
    d) permitting said mixture to cure, thereby forming a coating on said substrate.

2. A method according to claim 1 wherein an optional colorant or tint is admixed with said composition prior to its being applied to said substrate.

3. A method according to claim 1 wherein said quantity of water is any quantity of water sufficient to render the resulting mixture to exist in a form capable of being applied to said substrate using conventional coatings application equipment.

4. A method according to claim 1 wherein said equipment comprises any equipment selected from the group consisting of paint brushes, paint rollers, and spray equipment.

5. A method of forming a coating on a substrate, comprising:
    a) providing a composition comprising which comprises:
        i) at least one water-soluble styrenic copolymer of an acrylic acid species, said styrenic copolymer being present in any amount between 30% and 80% by weight based on the total weight of said composition;
        ii) at least one emulsifying agent; and
        iii) at least one non-film-forming particulate substance, said composition existing in the form of a free-flowing powder, wherein the water content of said composition is between 0.5% and 1% by weight based on the total weight of the composition and wherein said non-film-forming particulate substance comprises a metal compound selected from the group consisting of calcium carbonate, zinc oxide, titanium dioxide, copper oxide, silicon dioxide, chromium (III) oxide, and zirconium dioxide,
    b) transporting said composition from a first point to a second point, said second point being at least 20 miles distant from said first point;
    c) storing said composition for at least one week;
    d) combining said composition with a sufficient quantity of water to yield a substantially-uniform mixture that can be spread or dispersed about said substrate;
    e) applying said mixture substantially uniformly to said substrate; and
    f) permitting said mixture to cure, thereby forming a coating on said substrate.

* * * * *